(12) United States Patent  
Potakowskyj et al.

(10) Patent No.: US 7,978,414 B2  
(45) Date of Patent: Jul. 12, 2011

(54) POSITIONING SYSTEM FOR A COMBINER IN A HEAD UP DISPLAY

(75) Inventors: Christoph Potakowskyj, Vienna (AT); Henricus Marie Ruyten, Gumpoldskirchen (AT); Alois Huber, Vienna (AT); Gottfried Hack, Neulengbach (AT); Peter Landbauer, Moedling (AT)

(73) Assignee: Jabil Circuit, Inc., St. Petersburg, FL (US)

( * ) Notice: Subject to any disclaimer, the term of this patent is extended or adjusted under 35 U.S.C. 154(b) by 267 days.

(21) Appl. No.: 12/239,384

(22) Filed: Sep. 26, 2008

(65) Prior Publication Data

US 2009/0086329 A1 Apr. 2, 2009

Related U.S. Application Data

(60) Provisional application No. 60/975,923, filed on Sep. 28, 2007.

(51) Int. Cl.
*G02B 27/14* (2006.01)

(52) U.S. Cl. ...................................... 359/630
(58) Field of Classification Search .................. 359/630, 359/443–446
See application file for complete search history.

(56) References Cited

U.S. PATENT DOCUMENTS

| 5,204,666 A * | 4/1993 | Aoki et al. ........................ 345/9 |
| 5,519,553 A * | 5/1996 | Hashimoto et al. ......... 360/294.2 |
| 7,528,798 B2 * | 5/2009 | Harada et al. ..................... 345/7 |
| 2008/0285138 A1 * | 11/2008 | Lebreton ....................... 359/630 |

FOREIGN PATENT DOCUMENTS

WO WO-2007/057608 5/2007

* cited by examiner

*Primary Examiner* — Ricky L Mack
*Assistant Examiner* — Vipin M Patel (57) ABSTRACT

A combiner positioning system (300) for a heads-up display (100). The positioning system (300) is arranged on a frame (302) including a base plate (334). A movable carrier (306) is provided for supporting a combiner (106) within the frame. The carrier (306) is movable between a first end of the frame, where the combiner (106) is in a retracted position (storage position), to a second end where the combiner is in a fully extended position (display position).

26 Claims, 11 Drawing Sheets

POSITIONING SYSTEM FOR A COMBINER IN A HEAD UP DISPLAY

CROSS REFERENCE TO RELATED APPLICATIONS

This application claims benefit of U.S. provisional patent application Ser. No. 60/975,923, filed Sep. 28, 2007, which is herein incorporated by reference.

BACKGROUND OF THE INVENTION

1. Field of the Invention

The present invention concerns electromechanical positioning systems, and more particularly an electromechanical positioning system for a mirror in a head up display.

2. Description of Related Art

A head-up display or HUD is a transparent display panel that presents information to a user without requiring him to look away from a preferred viewing direction. For example, a driver can view traffic and the road in front of the vehicle through the transparent panel of the HUD. A typical HUD includes a combiner, a projector, and a video data source such as a computer. The combiner is the transparent panel that is located in front of the person observing the display. The combiner usually includes one or more optical coatings that reflect only those specific wavelengths of monochromatic light that are projected by the HUD projector. The combiner can be thought of as a semi-transparent mirror. The HUD projector is usually mounted above or below the combiner. Images containing graphics or data are projected by the projector toward the combiner, which then projects the images toward the user.

Combiner positioning mechanisms for a HUD, which can move the combiner between a storage position and an operating position, are known in the art. For example, one such combiner is disclosed in PCT Publication No. WO 2007/057608 A1. Such positioning mechanisms have stored the combiner in a protected chassis when in a storage position. The combiner is mounted on a movable support that is displaceable between a rest position and a display position. The blade is retracted when the movable support is in the rest position and the combiner is extended from the chassis when the movable support is in the display position.

Still, combiner positioning mechanisms require careful consideration to ensure the performance in all kinds of environmental conditions such as high humidity, extreme temperatures, and the presence of contaminants that can cause corrosion. In such systems, careful choice of materials and design are necessary to provide smooth motion.

Repeatable positional accuracy is also important for combiner positioning mechanisms because an improperly positioned combiner will not function properly in a HUD system. Such positional accuracy can be achieved using high precision parts that are manufactured and maintained to very close tolerances. However, the need for such close tolerances has the undesirable effect of increasing the manufacture and maintenance expense associated with the positioning mechanism.

Another key design consideration relates to vibration. A mobile HUD system must have a high resistance to vibration in order to provide a stable image for the user. Failure to control vibration associated with the combiner in particular can result in a display that is irritating for the viewer and unpleasant to use over extended periods. Accordingly, a positioning system for a combiner in a HUD should have a high stability and a high natural frequency.

SUMMARY OF THE INVENTION

The invention concerns a combiner positioning system for a heads-up display. The positioning system is arranged on a frame including a base plate. A movable carrier is provided for supporting the combiner within the frame. The carrier is movable between a first end of the frame, where the combiner is in a retracted position (storage position), to a second end where the combiner is in a fully extended position (display position).

A parking member is mounted to the frame opposed from the base plate. The parking member is spaced apart a predetermined distance from the base plate. The carrier, when in the display position; is transported and rotated to a position between the parking member and the base plate. The carrier is resiliently grasped or clamped between the parking member and the base plate by using a force applied by a spring. A raised ridge is provided on a portion of the base plate as an aid to clamping or grasping the carrier in the display position.

The parking member includes a recess for receiving at least one pin provided on the carrier, the pin defines a pivot axis of the carrier such that the carrier is rotatable about the pivot axis when it is clamped between the base plate and the parking member. With the foregoing arrangement, the carrier is responsive to a force applied transverse to the pivot axis for making small changes to adjust the angular orientation of the combiner after it has been moved to the display position. A friction reducing member is disposed on a portion of the carrier adjacent to the base plate. The friction reducing member can be a wheel or a low friction material which is selected to slide along the surface of the base plate or upon some intervening low friction layer disposed on the base plate.

Sidewalls are provided arranged generally transverse to the base plate. A cam is positioned adjacent to an interior side of each side wall and extending along at least a portion of a length of the frame. The cams are arranged such that a distance between the base plate and the cam increases from a first end of the frame to an opposing second end of the frame. A gear rotatably mounted to each opposing side of the carrier engages a respective one of the cams. The cams guide the carrier from the storage position at the first end of the frame to the display position at the second end. The cam provides a guide or track for transporting the carrier from one position to another within the frame, and concurrently rotating the carrier from a storage orientation (in which the combiner is stored) to a display orientation (in which the combiner is ready for use).

A drive system is provided for automatically moving the carrier from the storage position to the display position. The drive system includes a screw spindle coupled to a motor, and a nut system threaded on the screw spindle. The spindle is generally aligned with a length of the cam. The nut system is operatively coupled to the carrier for urging the carrier along the length of the frame when the spindle is rotated by the motor. The same drive system is used to also provide small angular adjustments to the carrier when the combiner is in the display position. Opposing flanges are provided on the carrier. An edge of the combiner is clamped between the opposing flanges for securing the combiner. A layer of adhesive is disposed between the combiner and at least one of the flanges.

DETAILED DESCRIPTION

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention. The present invention may be embodied in many different forms and should not be construed as limited to the embodiments set forth herein. For example, the present invention can be embodied as a method or a system.

The invention concerns a positioning system for a combiner used in a head up display (HUD). The basic features and operation of the positioning system 100 are best understood with reference to FIGS. 1A and 1B. As illustrated therein, the positioning system includes a chassis 102. In a fully retracted position (not shown) the combiner 106 can be fully retracted within the protective confines of the chassis 102. The fully retracted position is also referred to herein as the storage position. The protective covering provided by the walls of the chassis 102 protects the combiner 106 from contamination, dust, and impacts. When in use, the combiner 106 is extended from an interior of the chassis through slot 108 or other suitable opening formed in the chassis. Tabs 104 are provided for mounting the positioning system in a vehicle or other structure.

Figure 1A:
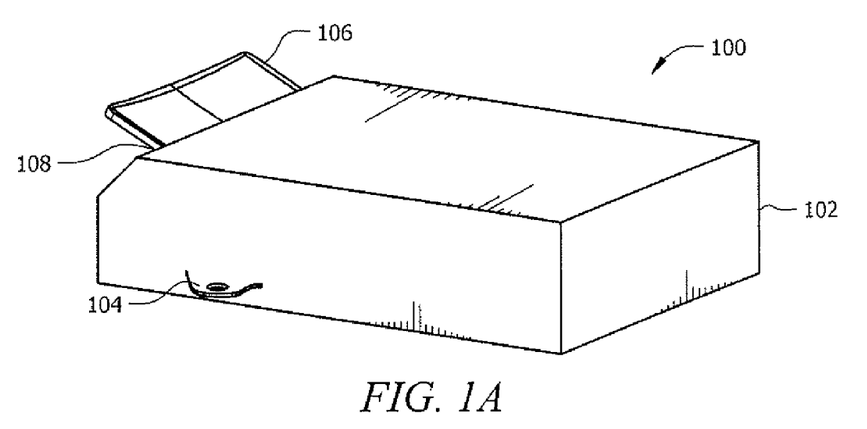
FIG. 1A is a perspective view of a positioning system for a combiner used in a HUD, in which the combiner is shown partially extended.
Figure 1B:
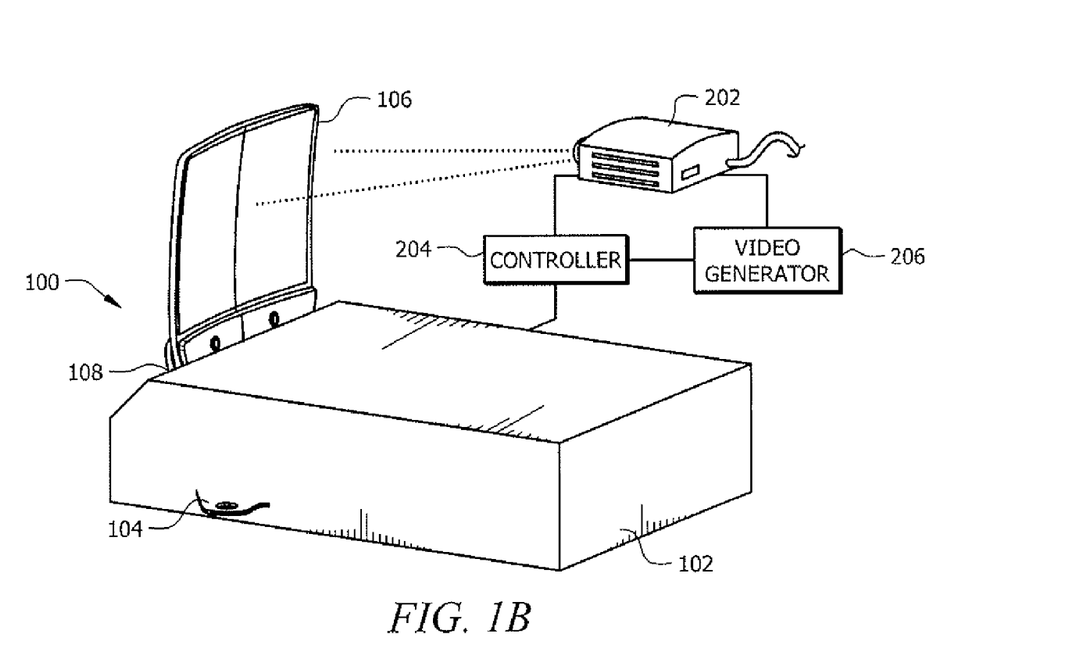
FIG. 1B is a perspective view of the positioning system in FIG. 1, with the combiner shown fully extended and ready for use.

FIG. 1A shows the combiner partially extended from the chassis 102. FIG. 1B shows the combiner 106 in a fully extended position (also referred to herein as the display position) where it is ready for use. A positioning mechanism provided within the chassis 102 is arranged to automatically move the combiner from its fully retracted position, where it is stored, to the fully extended position. It can be observed in FIGS. 1A and 1B that, as the combiner moves from the retracted to the extended position, it is transported and rotated from a storage orientation through an angle of approximately 90 degrees, to a display orientation. This arrangement advantageously allows the combiner to be used in the display orientation as needed, but still allows it to be stored in a storage orientation for protection and compactness of design. When the combiner is in the fully extended position for display, the combiner can be adjusted in minute increments to achieve proper function.

Combiners used in HUD devices are well known in the art and therefore will not be described in detail. However, it should be understood that the combiner 106 can be any type of combiner designed for operation in a HUD system that is now known or may be known in the future. For example, the combiner 106 can be formed of a generally planar transparent substrate that includes one or more optical coatings. The substrate can include, without limitation, transparent polymers and/or glass. The optical coatings are advantageously selected to reflect one or more specific wavelengths of monochromatic light.

Those skilled in the art will appreciate that the combiner positioning system 100 can be used in conjunction with a complete HUD system. In such a configuration, the HUD system can also include a light projector 202, a controller 204, and a video generator 206. Images that are projected by light projector 202 are reflected by the combiner toward an observer. The video generator 206 is coupled to the light projector 202 and is used to generate images to be projected on the combiner 106. The images can include text, graphics or a combination of the two.

The controller 204 is designed to control and coordinate the operation of the combiner positioning system 100, the video generator 206 and the projector 202. For example, the controller 204 can cause the combiner to be extended from the chassis 102 when the HUD is in use, and retracted into the chassis 102 when the system is not in use. The controller can also selectively apply power and control signals to the video generator 206 and the projector 202 to cause images to be projected toward the combiner 106 when the system is in use.

Those skilled in the art will appreciate that the controller can be implemented in a variety of different ways. For example, the controller 204 can be a programmable logic array, a microprocessor, or a general purpose computer programmed with a set of instructions. Still, the invention is not limited in this regard. Any suitable combination of components known now or in the future can be used for implementing a HUD system for use with the combiner positioning system 100 described herein.

Figure 2:
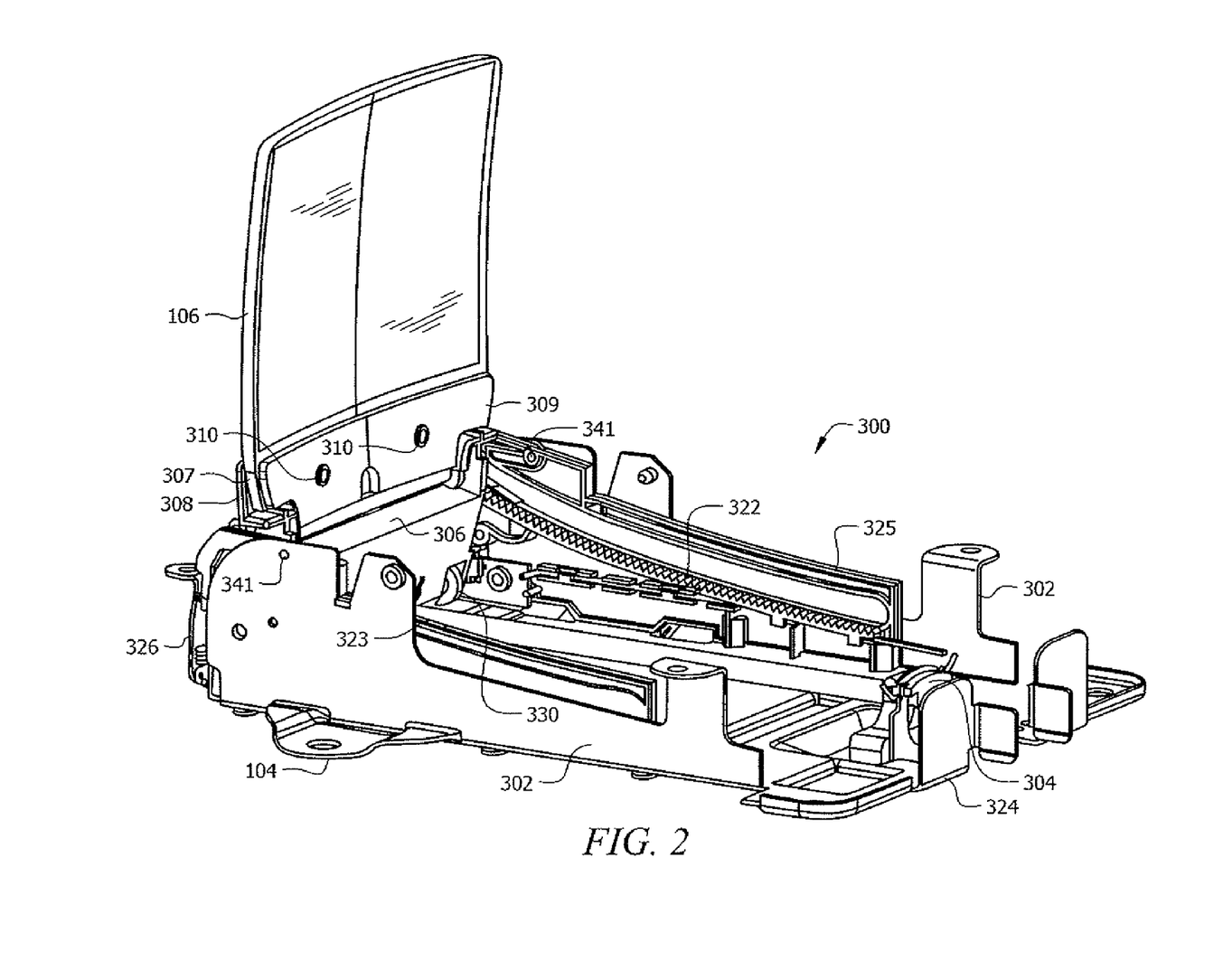
FIG. 2 is a perspective view of combiner positioning mechanism that is useful for understanding the invention.

Referring now to FIG. 2, there is shown a perspective view of a positioning mechanism 300 which is disposed within the chassis 102. In FIG. 2, the combiner 106 is shown in the fully extended or display position corresponding to FIG. 1B. The positioning mechanism 300 includes a frame 302 on which the combiner 106 is supported in a horizontal storage orientation when fully retracted, and in a vertical display orientation when fully extended. The frame includes a base plate 334 and side wall portions 323, 325. The side wall portions 323, 325 extend in a direction generally transverse to the base plate 334. The side wall portions 323, 325 can be integrated with the frame 302, or can be attached to and/or supported by the frame 302.

The movement and rotation of the combiner 106 relative to the frame 302 can be generally understood with reference to FIGS. 3-6. The combiner 106 is shown in its fully retracted positioning in FIG. 3. The combiner 106 is shown in various intermediate stages of extension in FIGS. 4-5, and is shown in its fully extended position in FIG. 6.

The features of the positioning mechanism 300 shall now be described in further detail. As shown in FIG. 2, the combiner 106 is securely attached to a carrier 306 to form a unit. The carrier 306 can be secured to the combiner 106 by any suitable means. In a preferred embodiment, however, the carrier 306 is comprised of a first and second flange 308, 309 each of which are formed of relatively stiff material. The stiff material can be any suitable material. For example, a metal or rigid plastic polymer can be used for this purpose without limitation. According to a preferred embodiment, the stiff material can be a plastic material reinforced with glass fiber. However, the invention is not limited in this regard. A face of flanges 308, 309 is generally formed with a profile which closely conforms to the profile of the combiner. For example, the faces of the flanges can have a planar or a slightly concave profile to match the contour of an edge of the combiner which is disposed between the flanges.

The first flange 308 can be integral part of the carrier 306. However, it can also be provided as a separate assembly that is secured to the carrier 306 by suitable means. An edge portion 307 of combiner 106 is advantageously secured or clamped between the first and second flange 308, 309. This arrangement helps prevent bending, flexing and/or physical distortion of the combiner during thermal cycling of the device and during periods of temperature stress. As used herein, temperature stress refers to extreme high or low temperatures that the combiner and positioning mechanism may be exposed to during use or storage.

According to a preferred embodiment, a layer of adhesive 354 is advantageously disposed between the edge portion 307 of combiner 306 and one or more of the flanges 308, 309. Use of adhesive in this context is advantageous because it increases the stiffness/natural frequency of the mirror. The adhesive also minimized problems with clamping of plastic combiners used at high temperatures, where material creep can cause a loss of pretension. Finally, vibration energy can be absorbed and/or damped by selecting the proper adhesive. Liquid adhesives are presently preferred for this purpose. However, the invention is not limited in this regard.

According to an embodiment of the invention, it is preferred that the adhesive 354 is disposed between the combiner 306 and each of the flanges 308, 309. Use of adhesive 354 on both sides of the combiner in this way is advantageous to prevent thermal variations from causing substantial distortion of the combiner. The adhesive prevents the combiner from deforming by forcing it to structurally conform to the shape of the flanges, even when the thermal variations might otherwise cause a distortion in the combiner.

The flanges 308, 309 can also be secured to the combiner 106 by additional or alternative means. For example, threaded members 310 can be provided which extend through the first flange and engage a threaded bore formed in the second flange.

Figure 3:
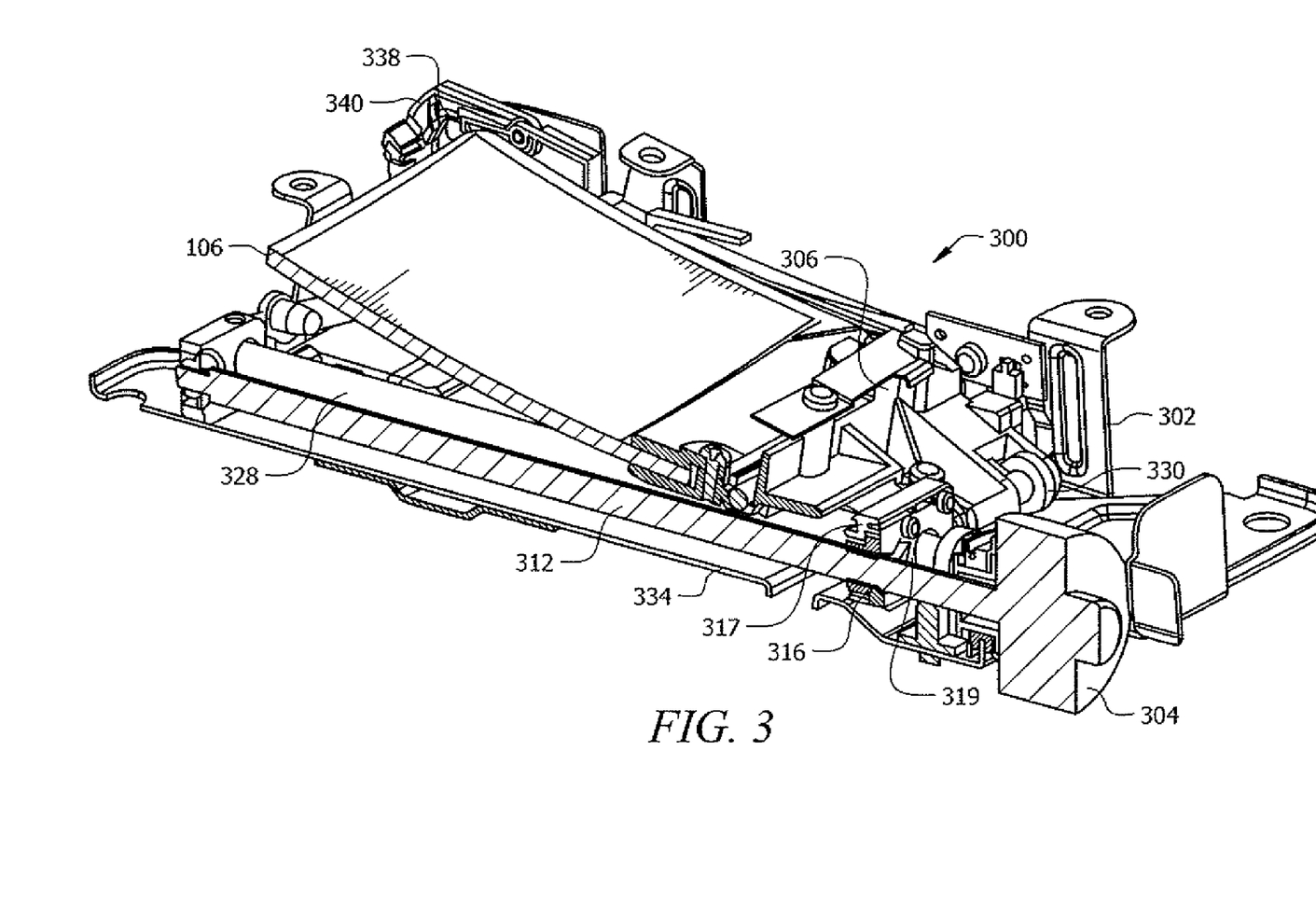
FIG. 3 is a perspective view of the combiner positioning mechanism in FIG. 2, shown in partial cross-section, with the combiner fully retracted to a storage position.
Figure 4:
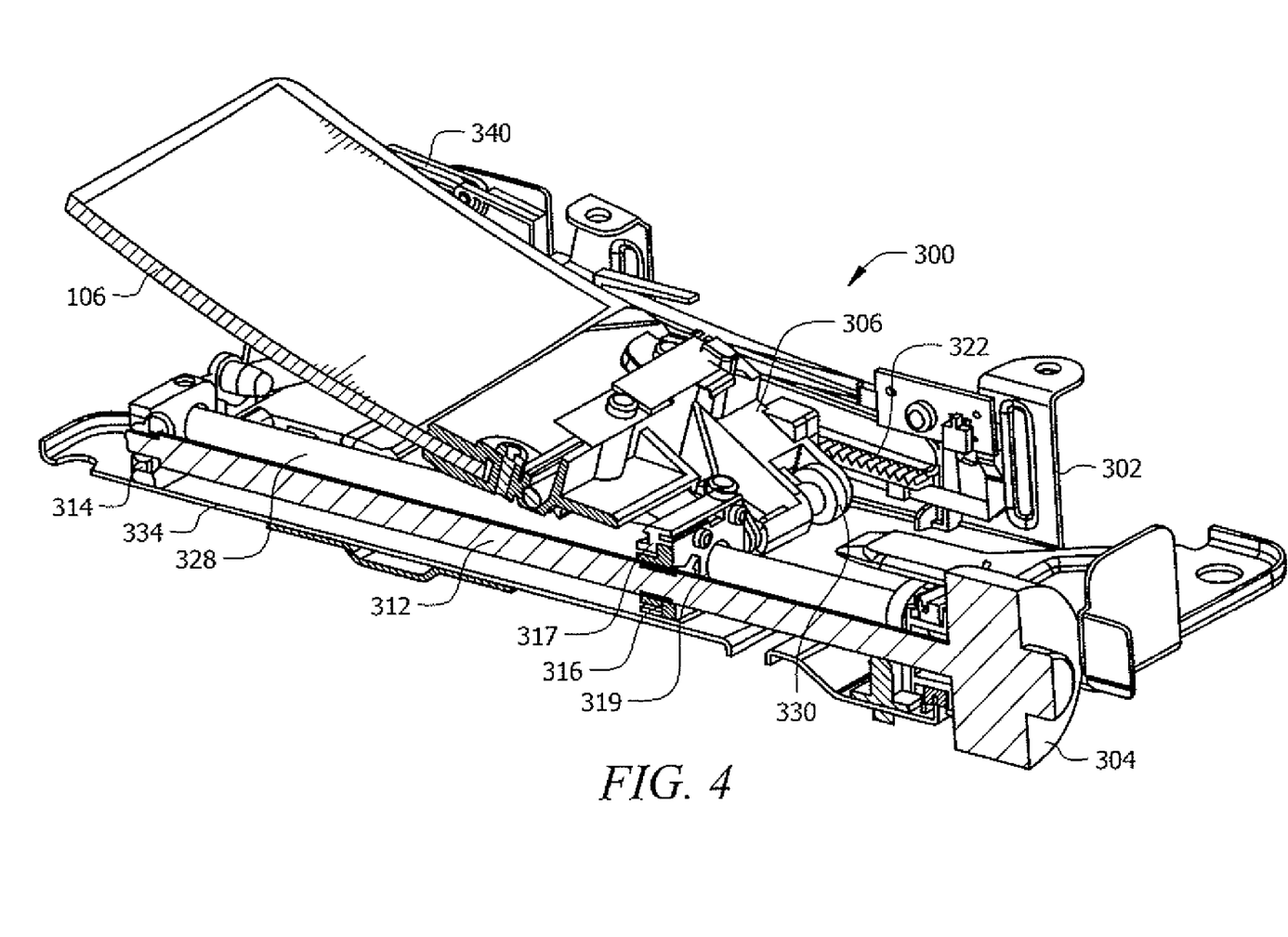
FIG. 4. is a perspective view of the combiner positioning mechanism in FIG. 3 with the combiner partially moved toward an extended position.
Figure 5:
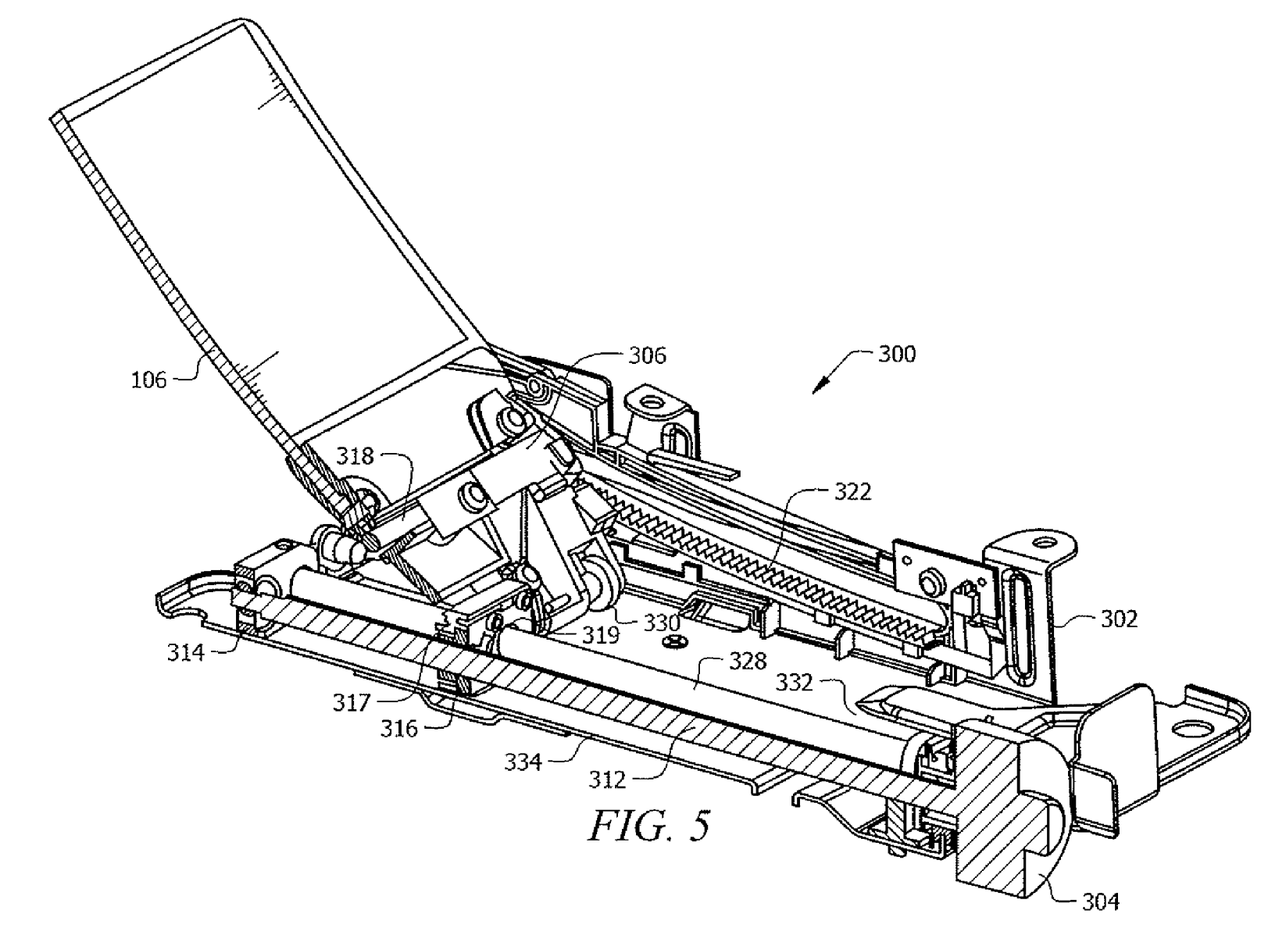
FIG. 5 is a perspective view of the combiner positioning mechanism in FIG. 3 with the combiner moved to an almost fully extended position.
Figure 6:
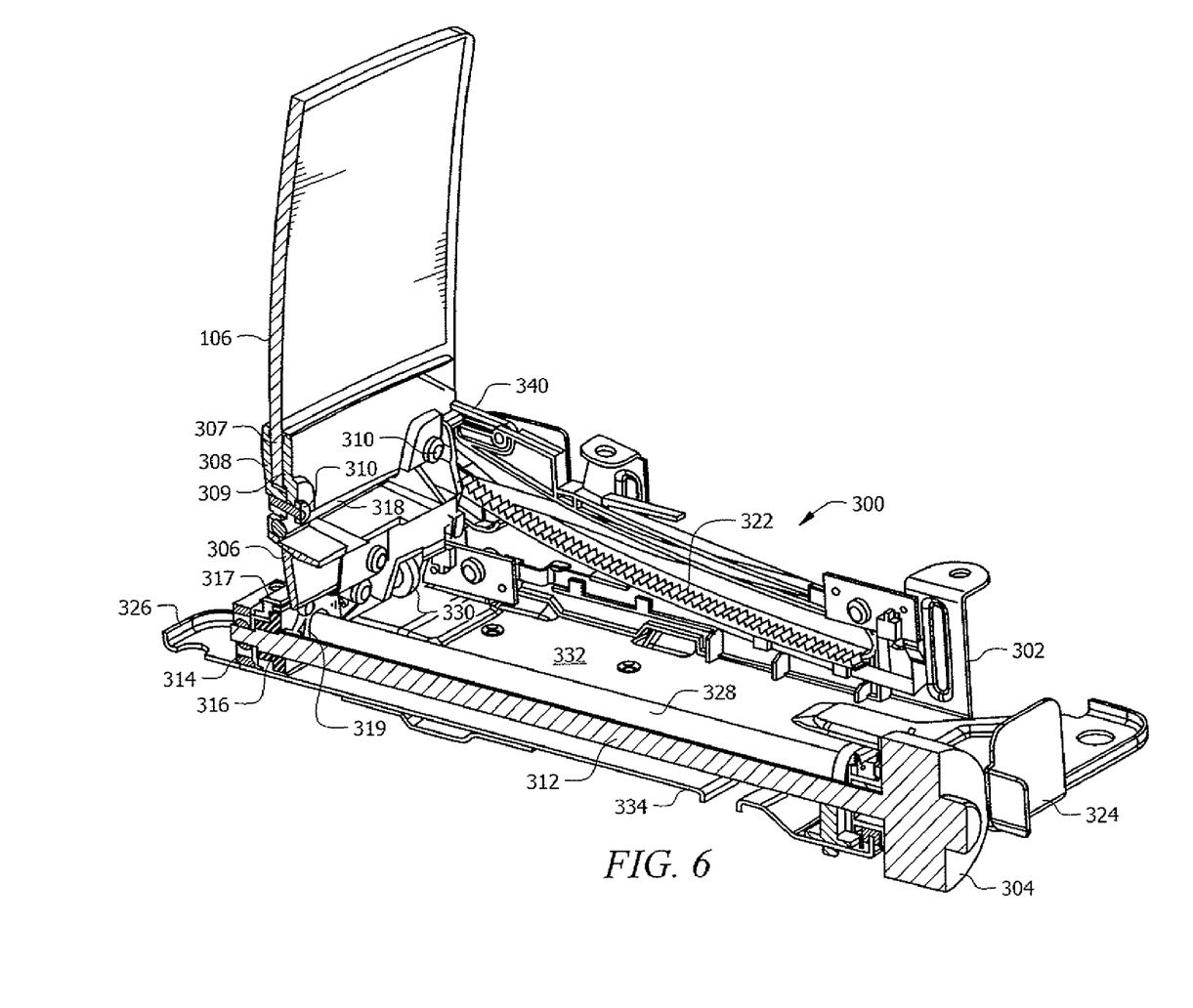
FIG. 6 is a perspective view of the combiner positioning mechanism in FIG. 3 with the combiner moved to a fully extended position and ready for use.

The carrier 306 moves from a first end 324 of the frame 302 (as shown in FIG. 3) to a second opposing end 326 of the frame (as shown in FIG. 6) when the combiner transitions from its fully retracted position to its fully extended position. A motor 304 is provided in order to cause the necessary movement of the carrier 306 and combiner 106. Any suitable motor can be used for this purpose provided that it is configured for clockwise and counterclockwise rotation responsive to input control signals. The motor 304 has an output drive shaft (not shown) operatively attached to a screw spindle 312 which is threaded along its length. The screw spindle is journaled in a bearing 314 disposed at an end of the screw spindle opposed from the motor 304. A nut system 316 is threaded on the screw spindle 312 such that turning the screw spindle 312 results in a horizontal movement of the nut system 316 along the length of the screw spindle (y-axis) as shown in FIGS. 3-6. The nut system 316 has a bearing 317 which engages the carrier 306, and urges the carrier along in a direction aligned with the y-axis when the screw spindle is rotated.

Adjacent and parallel to the spindle screw 312 there is provided a guide rod 328 which is provided for guiding the carrier 306. The guide rod 328 is positioned within a bore 319 that is formed in the bearing 319. With the foregoing arrangement, the bearing 319 can slide along the length of the guide rod 328 to control the motion of the carrier 306 as the nut system 316 is moved by the screw spindle 312. The movement direction of the nut system 316 along the y-axis defined by the screw spindle is determined by the clockwise or counter-clockwise rotation direction of the screw spindle.

Figure 7:
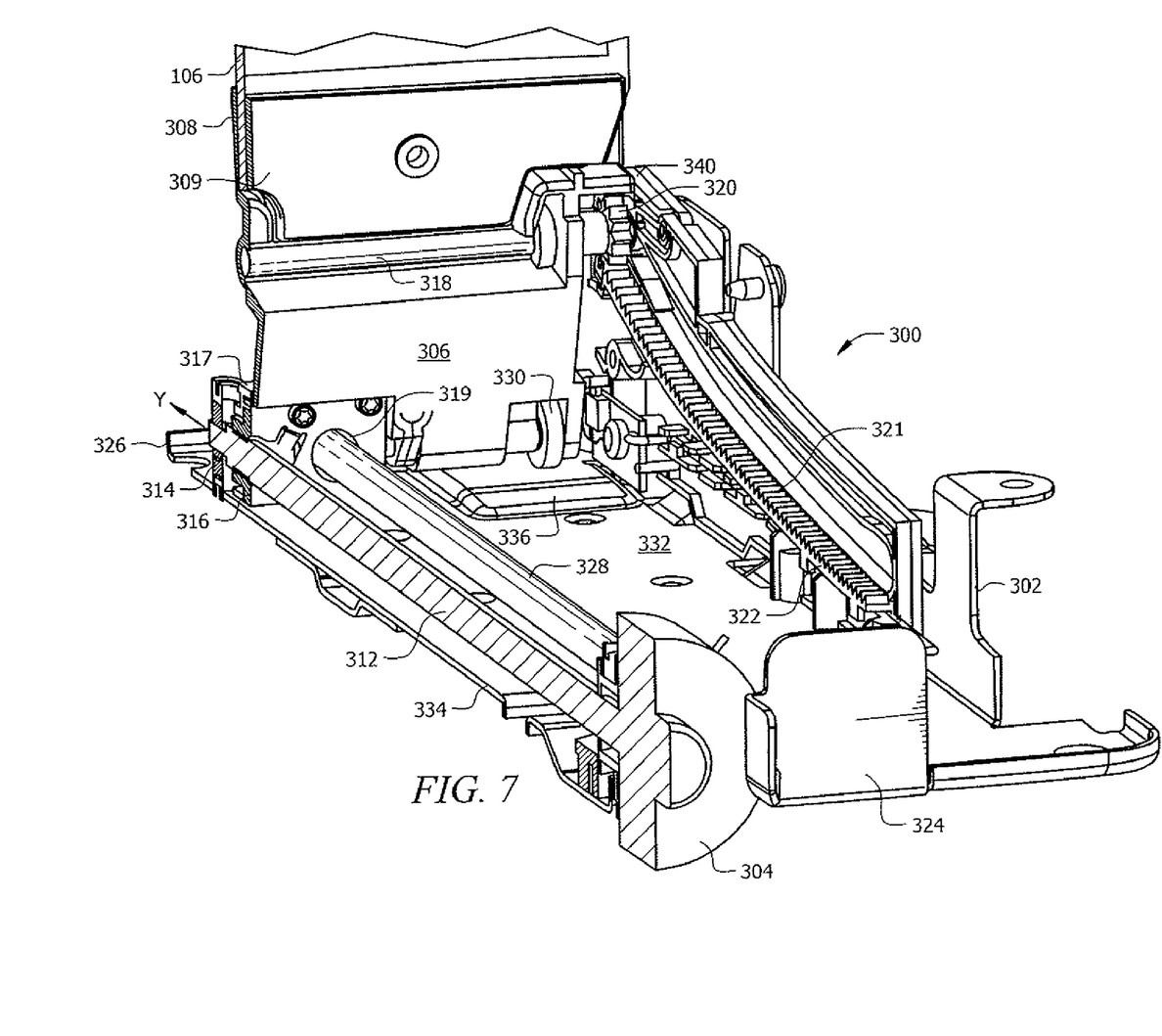
FIG. 7 is an enlarged perspective view of the combiner positioning mechanism in FIG. 3 with the combiner moved to a fully extended position and ready for use.

Referring now to FIG. 7, the carrier 306 is comprised of a gear 320 disposed on an axial member 318. A second gear 320 is also provided on an opposing end of the axial member 318. Since the positioning mechanism 300 is shown in cutaway view in FIG. 7, only a single one of the gears 320 is shown. However, it should be understood that the second gear 320 is substantially the mirror image of the gear 320 that is shown. When the carrier 306 is moved along the length of the screw spindle 312, the gears 320 run in two cams 322, only one of which is shown in FIG. 7. A first cam is formed in side wall portion 325 of the mechanism. A second cam (not shown) is provided on opposing side wall portion 323 of the positioning mechanism 300. The second cam is substantially a mirror image of the cam 322 and performs a corresponding function as hereinafter described. Gear teeth 321 are disposed along the length of each cam 322 as shown for engaging each gear 320.

As may be observed in FIG. 7, the cams 322 are not parallel to the base plate 334 or the to the elongated length of the screw spindle 312. Instead, the distance between the y-axis (defined by the screw spindle 312) and the cams 322 increases from the first end 324 of the frame to the second end of the frame 326. Thus, the carrier 306 is elevated as it moves the combiner 106 toward the fully extended position. This structure of the cams 322 causes rotation of the combiner to the erect position shown in FIGS. 6 and 7 as the combiner moves toward the fully extended position at the second end of the frame.

Referring again to FIG. 7, a wheel 330 is provided at a bottom edge portion of the carrier 306. A second wheel 330 can also be provided on an opposing end of the carrier 306. Since the positioning mechanism 300 is shown in cutaway view in FIGS. 3-7, only a single one of the wheels 330 is shown. However, it should be understood that the second gear 320 is substantially the mirror image of the wheel 330 that is shown. The wheels 330 are mounted on axles 348 disposed in carrier 306 which allow the wheels to rotate freely. The wheels are positioned on carrier 306 so that they move over surface 332 defined by a base plate 334 as the carrier is transported by the gears 320 and cam 322. According to an embodiment of the invention, the wheels move over surface 332 without necessarily touching the surface. However, the invention is not limited in this regard and other arrangements the wheels can roll over at least a portion of surface 332.

Figure 9A:
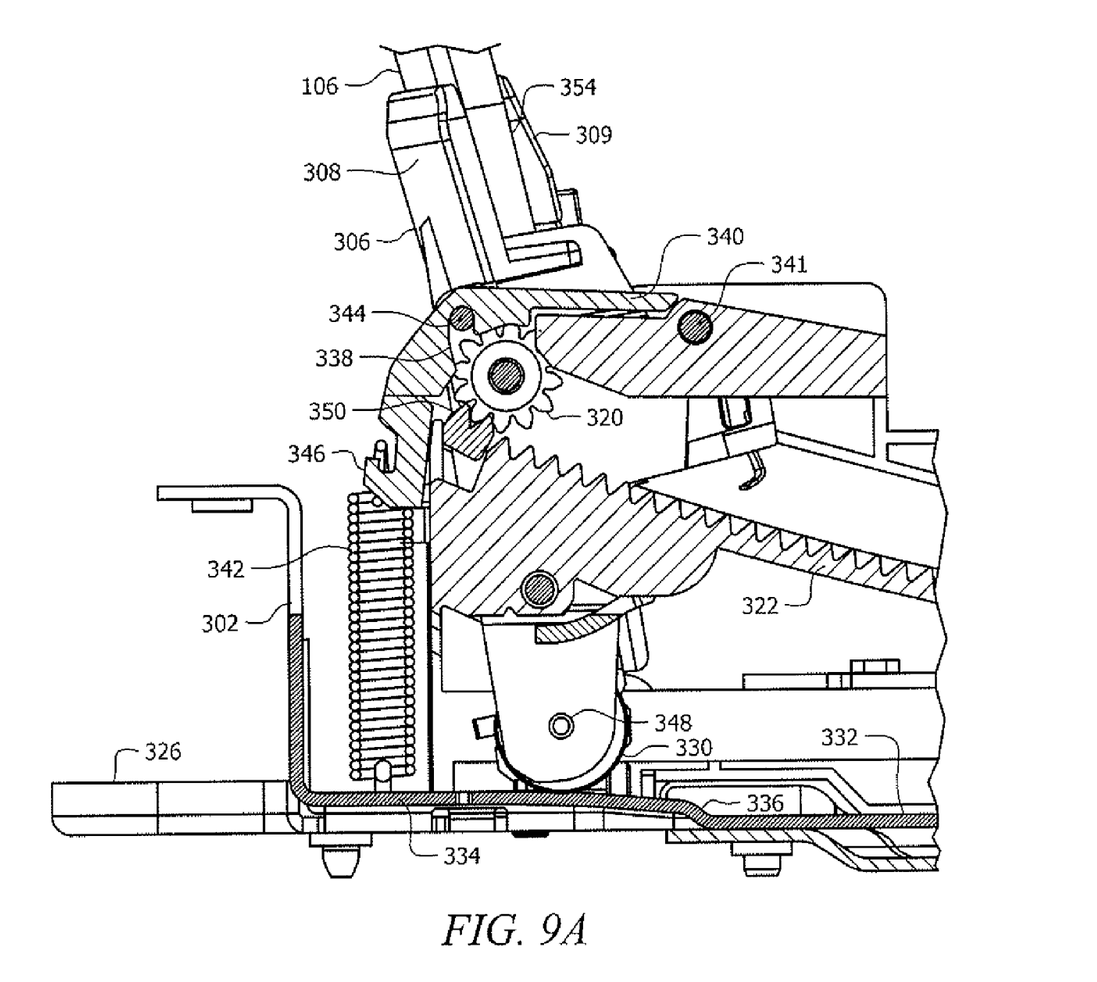
FIG. 9A is a cross-sectional view of the combiner positioning mechanism just before the carrier reaches the fully extended position.

As the carrier 306 moves from the first end of the frame 324 to the opposing second end of the frame 326, the wheels approach a ridge 336 defined on the surface 332 of the base plate. The ridge is best shown in FIGS. 7 and 9. As the wheels begin to pass over the ridge, they engage its surface. This engagement is illustrated in FIG. 9A. Continued movement of the wheel 330 along the ridge 334 urges the a pin 344, secured to the side of the carrier 306, into a recess 338 defined in a parking member 340.

Figure 9B:
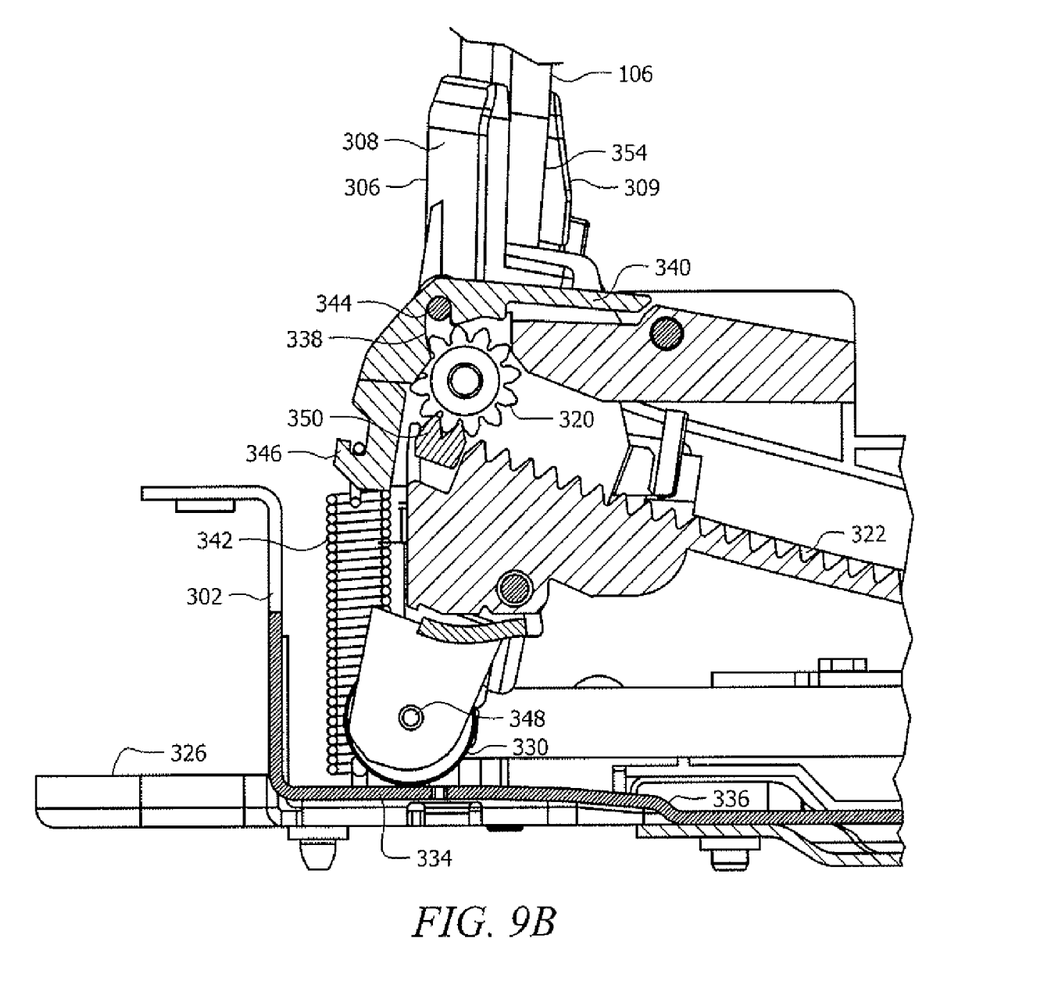
FIG. 9B is a cross-sectional view of the combiner positioning mechanism with the carrier in the fully extended position, ready for adjustment.
Figure 10:
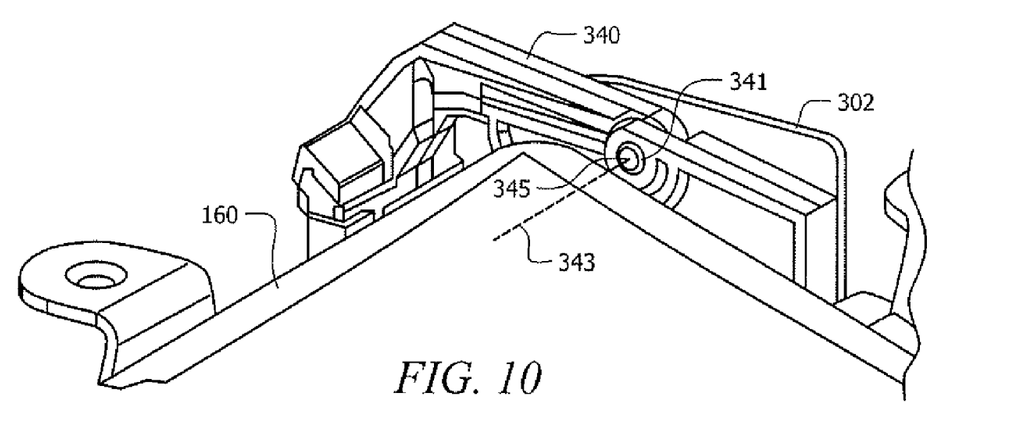
FIG. 10 is an enlarged perspective view showing a parking member of the combiner positioning mechanism.

An enlarged view of the parking member 340 is shown in FIG. 10. It can be observed in FIGS. 9 and 10 that the parking member 340 is pivotably secured to frame 302 at pivot point 341. Any suitable fastener 345 can be used for this purpose. For example, the fastener 345 can be a threaded screw or a rivet secured to the frame 340. The fastener can pass through a bore (not shown) formed in the parking member 340. The pivoting motion of the parking member 340 defines a pivot axis 343 as shown in FIG. 10.

Referring once again to FIGS. 8 and 9, it can be observed that parking member 340 is resiliently biased at a first end 346 by a spring 342. The spring 342 is attached at a first end 346 of the parking member. An opposing end of the spring 342 is attached to the frame 302. The spring 342 resiliently urges the first end 346 of the parking member downwardly (in the direction of the base plate 334). The pin 344 is thus resiliently engaged securely in the recess 338.

It may be noted that the parking member 340 is shown to have the form of a lever. However, it should be understood that the invention is not limited in this regard. The parking member 340 merely needs to be a resiliently biased member having a recess into which the pin 338 is securely engaged. Accordingly, other structures can be used to define the parking member without limitation.

Referring again to FIG. 9A, the wheel 330 supports the carrier 306 against the resilient force applied by parking member 340 and spring 342. The force applied to the carrier 306 can cause the carrier 306 to shift downwardly slightly, toward the ridge 336. For example, the force applied by the spring 342 can cause the carrier 306 to shift downwardly about 0.2 mm. Accordingly, a clearance space is advantageously provided within bore 319 around the guide rod 328 to prevent binding of the guide rod within the bearing 317. Further, in order to prevent excessive play between the guide rod 328 and the bearing 317 a resilient spring member (not shown) can be provided within the bearing 317. The resilient spring, which is preferably in contact with the top of the guiding rod 328, is compressed against the guiding rod when the carrier 306 is urged downwardly in response to the engagement with the recess 338.

In FIG. 9B, it can be observed that the gear 320 has reached the end of its travel along the cam 322 and comes to rest in a stop member 350. In this position, the gear 320 is lifted out of the cam 322. This is accomplished by the gear 320 rotating and engaging the gear teeth formed into the stop member 350. With the gear 320 securely seated in the stop member 350, unwanted rotation of the gear 320 as may potentially be caused by vibration, is prevented.

According to one embodiment of the invention, the stop member 350 can be seated on a resilient spring member (not shown). However, this feature is not necessary to the invention and the stop member 350 can also be rigidly mounted. According to another embodiment of the invention, the cam 322 can be extended to include the position occupied by the stop member 350, and the stop member 350 can be eliminated entirely.

With the carrier securely positioned as shown in FIG. 9B, the pin 344 forms a rotational axis about which the carrier 306 and the combiner 106 can pivot. Notably, pin 344 permits the carrier 306 to rotate within the recess 338. The permitted rotation permits an angular adjustment of the carrier 306 (and the attached combiner 106) to facilitate proper operation of the combiner.

Figure 8:
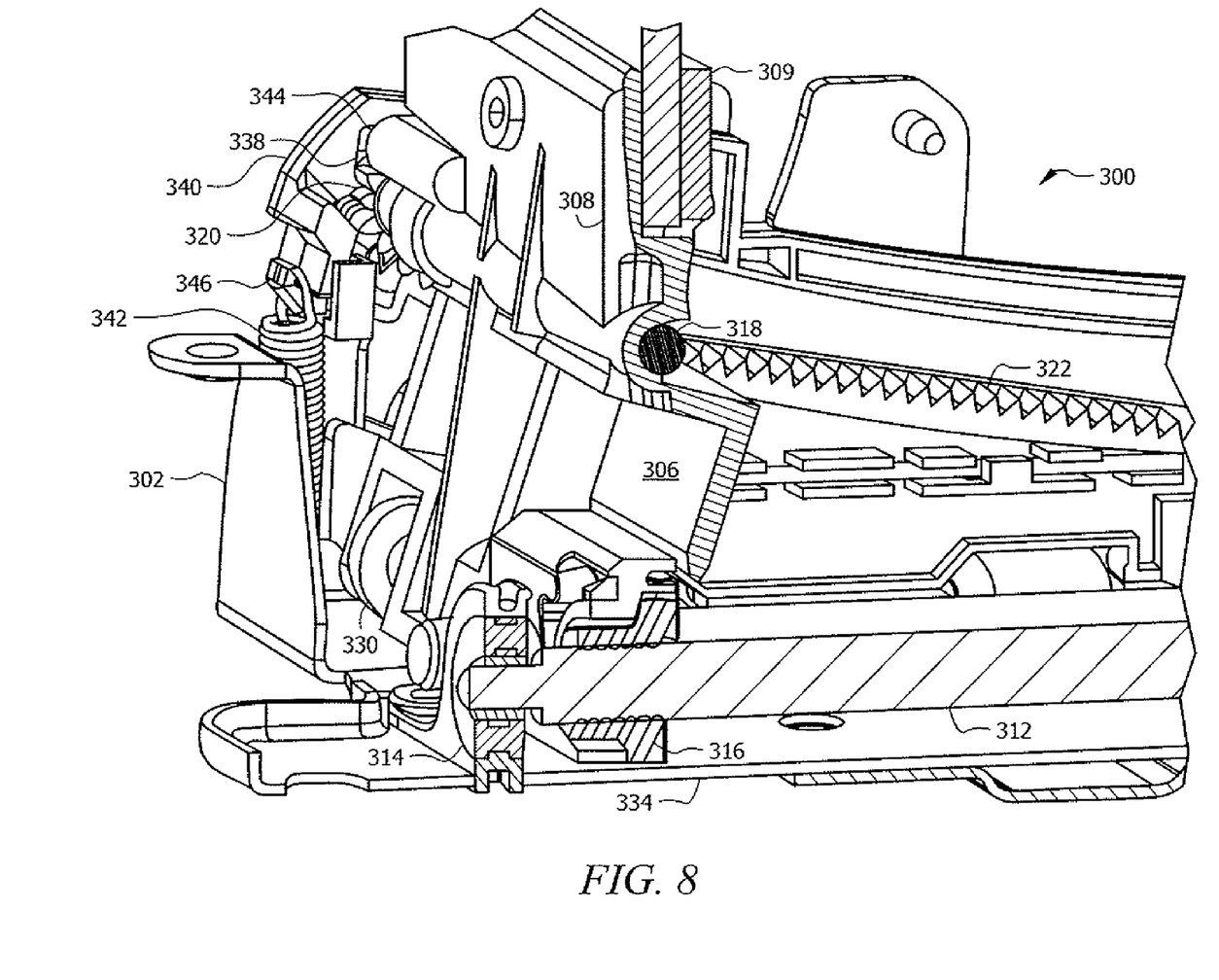
FIG. 8 is a rear perspective view of the combiner positioning mechanism in FIG. 3 with the combiner moved to a fully extended position and ready for use.

A second pin 344 can also be provided on an opposing end of the carrier 306. Since the positioning mechanism 300 is shown in cutaway view in FIGS. 3-9, only a single one of the pins is shown. However, it should be understood that the second pin 344 is substantially the mirror image of the pin 344 that is shown. Similarly, a second parking member 340, and a second spring 342, can also be provided on a side of the carrier 306 opposed from the first parking member. In other words, to have the whole combiner positioning mechanism properly balanced, the basic mechanism described in FIGS. 8-9 is provided symmetrically on each end of the carrier rotation axis defined by pin 344.

Figure 11:
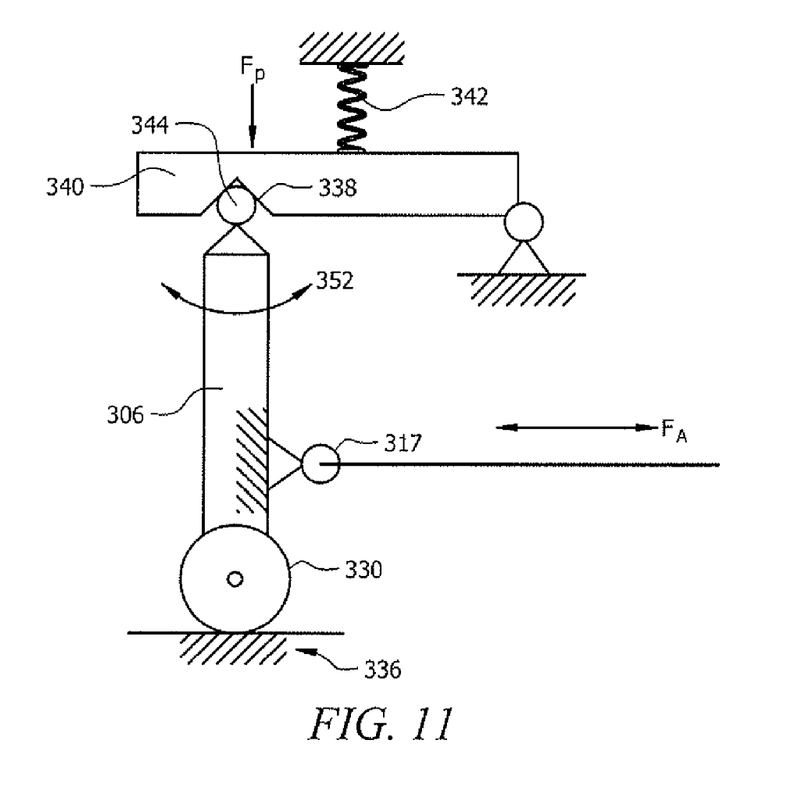
FIG. 11 is a schematic diagram that is useful for understanding the forces applied to a carrier in the combiner positioning mechanism of FIG. 9B.

FIG. 11 is a schematic diagram which shows the carrier 306 in its fully extended and locked position. It can be observed in FIG. 11 that the pin 344 is secured within the recess 338 by the resilient force of the parking member 340 and spring 342, thereby preventing lateral motion at the top of the carrier. The bottom of the carrier 306 is firmly supported on the wheel 330. Moreover, the lower portion of the carrier is prevented from moving by the force exerted upon it by the bearing 317. The bearing 317 is held immobile by the threaded portion of the screw spindle 312, which is not shown in FIG. 11.

In order to provide a rigid support for the combiner when it is fully extended, the carrier 306 must be clamped with a very high force. Still, in order to permit fine adjustment in the position of the combiner 106 even when the carrier is clamped, it must be possible to move the carrier 306 in fine steps with the same low motor torque as used when the carrier is threaded along the y-axis. The inventive arrangements permit both of these design goals to be effectively achieved.

Referring again to FIG. 11, note that the carrier 306 has a rotation axis about pin 344. The rotation axis permits a rotation of the carrier 306 within the recess 338, which in turn facilitates a certain angle of rotation 352 of the combiner. According to an embodiment of the invention, the motor 304 is responsive to control signals provided from controller 204 for rotating screw spindle 312 in small increments. The small increments of rotation facilitate precise angular adjustment of the combiner 106 by varying the angle of rotation 352.

A relatively large parking force is applied by spring 342 to the carrier 306 for securing the combiner in place. The force from spring 342 is applied from the recess 338, through carrier 306 and its wheels, into the base plate 334 (parking force). This relatively large force will make the system resistant against shock and vibration. As noted above, the entire carrier system is balanced by providing the mechanism shown in FIGS. 8 and 9 symmetrically on each side of the carrier rotation axis.

While the foregoing arrangements represent one possible solution to the vibration problem, it should be understood that the invention is not limited in this regard. For example, instead of the interaction of the spring loaded parking member 340 and ridge 336, the same objective could also be achieved by any other spring force solution. For example, the carrier 306 could be divided into an upper and a lower part where two parts are spring loaded to push away from each other. Alternatively, it will be appreciated that the wheels 330 on the carrier 306 could be resiliently mounted at the base of the carrier so that they can deflect towards the combiner 106 when riding up on ridge 336. Either of these solutions can provide a substantial force between the recess 338 and the base plate 334. Still, the invention is not limited in this regard.

With the arrangement described herein, any minor adjustments in the angular position of the combiner 106 can be made by application of an adjustment force $F_A$ as shown in FIG. 11. Significantly, however, because the adjustment force is applied at an angle of approximately 90° relative to the parking force, the direction of the adjustment force can be much smaller than the parking force $F_P$. Consequently, only a small force $F_A$ in an adjustment direction (y-axis) is required to maintain an exact position of the carrier.

Finally, it should be noted that placement of the wheels 330 on the carrier 306 running along the base plate 334 provides an effective solution with regard to the adjustment problem. The parking force $F_P$ is entirely supported by the wheels 330. Advantageously, however, the wheels 330 can still roll with reasonable amount of friction under a high spring load applied by spring 342. In principle however, the wheels 330 can also be replaced by any low friction slide solution. For example, the base of the carrier can be provided with a low friction bearing member that engages a corresponding low friction surface supported on the base plate. Still, the invention is not limited in this regard. Any suitable low friction material can be used for this purpose.

When the combiner is to be returned to its retracted position, the direction of the motor 304 is reversed. The resulting motion of the carrier 306 is the same as previously described, except that the carrier now moves in the opposite direction, toward the first end 324 of the frame 302. The actions described above in FIGS. 3-7 are performed in reverse order.

All of the apparatus, methods and algorithms disclosed and claimed herein can be made and executed without undue experimentation in light of the present disclosure. While the invention has been described in terms of preferred embodiments, it will be apparent to those of ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to one of ordinary skill in the art are deemed to be within the spirit, scope and concept of the invention as defined.

The invention claimed is:

1. A method for controlling a position of a combiner in a head-up display, comprising:
    positioning at least one parking member spaced apart a distance from a base member, wherein a resilient spring member exerts a resilient spring force between the parking member and the base member;
    positioning a combiner for a head-up display in a position for use, by positioning a carrier which supports said combiner in a display position where said carrier extends in a first direction between said at least one parking member and said base member, wherein the extending in the first direction increases the resilient spring force of the resilient spring member and wherein the extending in the first direction establishes a pivot axis about which the combiner is able to pivot; and
    applying the resilient spring force to resiliently secure said carrier between said parking member and said base member, wherein the resilient spring force exerts a force between the parking member and the base member and between the carrier and the base member, wherein the increase of the resilient spring force results in a corresponding increase of the force between the parking member towards the base member and a corresponding increase of the force between the carrier towards the base member.

2. The method according to claim 1, comprising rotating said carrier about a pivot axis defined by said at least one parking member to adjust an angular orientation of said combiner.

3. The method according to claim 2, further comprising applying a force to said carrier transverse to said pivot axis to adjust said angular orientation.

4. The method according to claim 3, further comprising applying said force using a screw drive having a rotatable screw spindle aligned transverse to said pivot axis, and a nut system movable along a length of said screw spindle responsive to said rotation.

5. The method according to claim 2, further comprising transporting and rotating said combiner from said position for use, to a position for storage, by guiding said carrier with at least one cam which extends transverse to said pivot axis, further comprising guiding said carrier with a first and second one of said cams, each extending transverse to said pivot axis, and engaging each of said first and second cams with a respective first and second gear rotatably mounted to said carrier.

6. The method according to claim 5, further comprising using a screw drive to move said gear along said first and second cams.

7. The method according to claim 1, wherein a force applied to the carrier to adjust an angular orientation of said combiner is applied approximately transverse to said resilient spring force.

8. The method according to claim 1, further comprising securing said combiner between opposing flanges of said carrier along an edge portion thereof, and applying a layer of adhesive between said combiner and at least one said flange.

9. A combiner positioning system, comprising:
    a frame including a base plate;
    a carrier supporting a combiner for a head-up display, said carrier movable within said frame between a first end where said combiner is in a storage position to a second end where said combiner is in a display position;
    a parking member opposed from said base plate and spaced apart a predetermined distance therefrom; and
    a resilient spring member for exerting a resilient spring force between the parking member and the base plate;
    wherein said carrier, when in said display position; is resiliently secured between said parking member and said base plate by the resilient spring force, wherein the resilient spring force increases when the carrier is moved from the storage position to the display position, wherein the resilient spring force exerts a force between the parking member and the base plate and between the carrier and the base plate when in the display position, wherein the increase of the resilient spring force that occurs when the carrier is moved from the storage position to the display position results in a corresponding increase of the force between the parking member and the base plate and a corresponding increase of the force between the carrier and the base plate.

10. The combiner positioning system according to claim 9, further comprising:

a first and second sidewall opposed from each other and arranged generally transverse to said base plate; and a first and second cam respectively positioned adjacent to each of said first and second side wall and extending along a length of said frame between said first end and said second end.

11. The combiner positioning system according to claim 10, wherein a first and second one of said sidewalls are provided opposed from each other and arranged generally transverse to said base plate, and first and second ones of said cams are respectively disposed adjacent to said sidewalls.

12. The combiner positioning system according to claim 11, wherein said carrier comprises a first and second gear rotatably mounted in said carrier, said first and second gear extending toward and engaging a respective one of said first and second cams, and wherein said first and second cams guide said carrier from said storage position at said first end to a display position at said second end.

13. The combiner positioning system according to claim 11, further comprising a drive system for automatically moving said carrier from said storage position to said display position, wherein said drive system comprises a screw spindle and a nut system threaded on said screw spindle, wherein a distance between said cam and an axis defined by said screw spindle increases from the first end to the second end of said frame.

14. The combiner positioning system according to claim 9, wherein a force applied to the carrier to adjust an angular orientation of said combiner is applied approximately transverse to said resilient spring force.

15. The combiner positioning system according to claim 9, wherein said parking member includes a recess for receiving at least one pin provided on said carrier, said pin defining a pivot axis of said carrier, wherein the resilient spring force applied by the resilient spring member causes the parking member to push downward on the pin in the direction of the base plate when the pin is positioned in the recess, and wherein said carrier is rotatable about said pivot axis responsive to a force applied transverse to said pivot axis for adjusting an angular orientation of said combiner.

16. The combiner positioning system according to claim 15, further comprising at least one friction reducing member disposed on a portion of said carrier adjacent to said base plate, said friction reducing member selected from the group consisting of a wheel and a low friction material.

17. The combiner positioning system according to claim 15, further comprising a drive system for applying said force, said drive system comprises a screw spindle and a nut system threaded on said screw spindle, wherein said spindle is generally aligned with a length of said cam so that said nut system is movable along a length of said frame when said screw spindle is rotated.

18. The combiner positioning system according to claim 9, wherein said carrier comprises opposing flanges between which said combiner is disposed along one edge for securing said combiner, and at least one layer of adhesive is disposed between said combiner and at least one said flange.

19. A combiner positioning system, comprising:
a frame including a base plate;
first and second opposing sidewalls, each arranged generally transverse to said base plate;
first and second cams respectively supported by said first and second opposing sidewalls and extending along at least a portion of a length of said frame;
a carrier supporting a combiner for a head-up display, said carrier movable and rotatable within said frame between a first end where said combiner is in a storage position to a second end where said combiner is in a display position;
a first and a second gear rotatably mounted in said carrier on a common axis, said first gear extending toward and engaging said first cam, and said second gear extending toward and engaging said second cam;
wherein a travel of said gears in said cams rotate and guide said carrier from said storage position when said carrier is at said first end to a display position when said carrier is at said second end.

20. The combiner positioning system according to claim 19, further comprising:
a parking member opposed from said base plate and spaced apart a predetermined distance therefrom, wherein said carrier, when in said display position; is resiliently secured between said parking member and said base plate; and
a resilient spring member for exerting a resilient spring force between the parking member and the base plate, said carrier, when in said display position; is resiliently secured between said parking member and said base plate by the resilient spring force, wherein the resilient spring force increases when the carrier is moved from the storage position to the display position, wherein the resilient spring force exerts a force between the parking member and the base plate and between the carrier and the base plate when in the display position, wherein the increase of the resilient spring force that occurs when the carrier is moved from the storage position to the display position results in a corresponding increase of the force between the parking member and the base plate and a corresponding increase of the force between the carrier and the base plate.

21. The combiner positioning system according to claim 19, further comprising a drive system for automatically moving said carrier from said storage position to said display position, wherein said drive system comprises a screw spindle coupled to a motor, and a nut system threaded on said screw spindle.

22. The combiner positioning system according to claim 21, wherein a distance between said cam and an axis defined by said screw spindle increases over a length of said cam extending from said first end to said second end.

23. The combiner positioning system according to claim 19, wherein said parking member includes a recess for receiving at least one pin provided on said carrier, said pin defining a pivot axis of said carrier, and wherein said carrier is rotatable about said pivot axis responsive to a force applied transverse to said pivot axis for adjusting an angular orientation of said combiner.

24. The combiner positioning system according to claim 19, further comprising at least one friction reducing member disposed on a portion of said carrier adjacent to said base plate, said friction reducing member selected from the group consisting of a wheel and a low friction material.

25. The combiner positioning system according to claim 19, wherein said carrier comprises opposing flanges between which said combiner is disposed along one edge for securing said combiner, and at least one layer of adhesive is disposed between said combiner and at least one said flange.

26. A combiner positioning system, comprising a frame including a base plate;
a carrier supporting a combiner for a head-up display;
a positioning system configured for automatically concurrently transporting and rotating said carrier from a storage position to a display position; wherein said carrier comprises opposing flanges between which said combiner is disposed along one edge for securing said combiner, and at least one layer of adhesive is disposed between said combiner and at least one flange;
a parking member;
a base plate;
a resilient spring member for exerting a resilient spring force between the parking member and the base plate; and
wherein said carrier, when in said display position; is resiliently secured between said parking member and said base plate by the resilient spring force, wherein the resilient spring force increases when the carrier is moved from the storage position to the display position, wherein the resilient spring force exerts a force between the parking member and the base plate and between the carrier towards the base plate when in the display position, wherein the increase of the resilient spring force that occurs when the carrier is moved from the storage position to the display position results in a corresponding increase of the force between the parking member and the base plate and a corresponding increase of the force between the carrier and the base plate.

* * * * *